(12) United States Patent
Baker et al.

(10) Patent No.: US 7,554,953 B2
(45) Date of Patent: Jun. 30, 2009

(54) RADIO COMMUNICATION SYSTEM

(75) Inventors: Matthew P. J. Baker, Canterbury (GB); Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1302 days.

(21) Appl. No.: 10/113,051

(22) Filed: Apr. 1, 2002

(65) Prior Publication Data

US 2002/0196742 A1      Dec. 26, 2002

(30) Foreign Application Priority Data

Apr. 4, 2001    (GB)    ................. 0108381.5

(51) Int. Cl.
*H04J 13/00* (2006.01)
*H04B 7/216* (2006.01)
*H04B 1/66* (2006.01)
*H04B 14/06* (2006.01)

(52) U.S. Cl. .............. 370/335; 370/342; 370/479; 375/265; 375/240.1

(58) Field of Classification Search ............. 370/335, 370/337, 342, 347, 318, 479, 478, 329, 358, 370/441, 527, 320, 321, 322; 375/130, 146, 375/240.27, 316, 351, 350, 265, 240.1, 246, 375/240.24; 455/522, 69, 403, 560
See application file for complete search history.

(56) References Cited

U.S. PATENT DOCUMENTS 4,794,649 A  * 12/1988  Fujiwara ................. 455/9
5,056,109 A  * 10/1991  Gilhousen et al. ......... 370/342
5,659,569 A  *  8/1997  Padovani et al. ......... 370/479
5,883,899 A  *  3/1999  Dahlman et al. ......... 370/468
5,991,642 A  * 11/1999  Watanabe et al. ......... 455/560
6,101,626 A  *  8/2000  Morelos-Zaragoza et al. .................. 714/786
6,341,125 B1 *  1/2002  Hong et al. ............... 370/335
6,496,706 B1 * 12/2002  Jou et al. .................. 455/522
6,724,742 B1 *  4/2004  Mun et al. ................ 370/342
6,747,963 B1 *  6/2004  Park et al. ................ 370/335

FOREIGN PATENT DOCUMENTS

| EP | 1102440 A2 | 5/2001 |
|----|----|----|
| WO | WO 0042804 | 7/2000 |
| WO | 00/62435 A1 | 10/2000 |
| WO | 00/62456 A1 | 10/2000 |
| WO | 01/03366 A1 | 1/2001 |

OTHER PUBLICATIONS

PCT International Search Report for PCt/IB02/00941, 4 pages.

* cited by examiner

*Primary Examiner*—Hanh Nguyen

(57) ABSTRACT

A radio communication system comprises a communication channel for the transmission of data from a secondary station to a primary station. The secondary station is operable in a first (normal) and a second (gated) mode, with a reduced quantity of data being transmitted in the second mode. The secondary station generates a coded word providing information on the transport formats applicable to the channel and transmits this coded word repeatedly to the primary station. Different coding schemes are used to generate the coded word in each mode of operation, thereby enabling improved performance in gated mode compared to truncating the coded word.

12 Claims, 3 Drawing Sheets

| $i$ | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ |
|---|---|---|---|---|---|---|---|---|---|---|
| 0 | 1 | 0 | 0 | 0 | 0 | 1 | 0 | 0 | 0 | 0 |
| 1 | 0 | 1 | 0 | 0 | 0 | 1 | 1 | 0 | 0 | 0 |
| 2 | 1 | 1 | 0 | 0 | 0 | 1 | 0 | 0 | 0 | 1 |
| 3 | 0 | 0 | 1 | 0 | 0 | 1 | 1 | 0 | 1 | 1 |
| 4 | 1 | 0 | 1 | 0 | 0 | 1 | 0 | 0 | 0 | 1 |
| 5 | 0 | 1 | 1 | 0 | 0 | 1 | 0 | 0 | 1 | 0 |
| 6 | 1 | 1 | 1 | 0 | 0 | 1 | 0 | 1 | 0 | 0 |
| 7 | 0 | 0 | 0 | 1 | 0 | 1 | 0 | 1 | 1 | 0 |
| 8 | 1 | 0 | 0 | 1 | 0 | 1 | 1 | 1 | 1 | 0 |
| 9 | 0 | 1 | 0 | 1 | 0 | 1 | 1 | 0 | 1 | 1 |
| 10 | 1 | 1 | 0 | 1 | 0 | 1 | 0 | 0 | 1 | 1 |
| 11 | 0 | 0 | 1 | 1 | 0 | 1 | 0 | 1 | 1 | 0 |
| 12 | 1 | 0 | 1 | 1 | 0 | 1 | 0 | 1 | 0 | 1 |
| 13 | 0 | 1 | 1 | 1 | 0 | 1 | 1 | 0 | 0 | 1 |
| 14 | 1 | 1 | 1 | 1 | 0 | 1 | 1 | 1 | 1 | 1 |
| 15 | 1 | 0 | 0 | 0 | 1 | 1 | 1 | 1 | 0 | 0 |
| 16 | 0 | 1 | 0 | 0 | 1 | 1 | 1 | 1 | 0 | 1 |
| 17 | 1 | 1 | 0 | 0 | 1 | 1 | 1 | 0 | 1 | 0 |
| 18 | 0 | 0 | 1 | 0 | 1 | 1 | 0 | 1 | 1 | 1 |
| 19 | 1 | 0 | 1 | 0 | 1 | 1 | 0 | 1 | 0 | 1 |
| 20 | 0 | 1 | 1 | 0 | 1 | 1 | 0 | 0 | 1 | 1 |
| 21 | 1 | 1 | 1 | 0 | 1 | 1 | 0 | 1 | 1 | 1 |
| 22 | 0 | 0 | 0 | 1 | 1 | 1 | 0 | 1 | 0 | 0 |
| 23 | 1 | 0 | 0 | 1 | 1 | 1 | 1 | 1 | 0 | 1 |
| 24 | 0 | 1 | 0 | 1 | 1 | 1 | 1 | 0 | 1 | 0 |
| 25 | 1 | 1 | 0 | 1 | 1 | 1 | 1 | 0 | 0 | 1 |
| 26 | 0 | 0 | 1 | 1 | 1 | 1 | 0 | 0 | 1 | 0 |
| 27 | 1 | 0 | 1 | 1 | 1 | 1 | 1 | 1 | 0 | 0 |
| 28 | 0 | 1 | 1 | 1 | 1 | 1 | 1 | 1 | 1 | 0 |
| 29 | 1 | 1 | 1 | 1 | 1 | 1 | 1 | 1 | 1 | 1 |
| 30 | 0 | 0 | 0 | 0 | 0 | 1 | 0 | 0 | 0 | 0 |
| 31 | 0 | 0 | 0 | 0 | 1 | 1 | 1 | 0 | 0 | 0 |

FIG. 3

RADIO COMMUNICATION SYSTEM

The present invention relates to a radio communication system and further relates to primary and secondary stations for use in such a system and to a method of operating such a system. While the present specification describes a system with particular reference to the emerging Universal Mobile Telecommunication System (UMTS), it is to be understood that such techniques are equally applicable to use in other mobile radio systems.

A continuing requirement in radio communication systems is to minimise the power consumption of mobile terminals, thereby increasing battery life (or reducing required battery capacity). A particular scenario in which this is relevant is when the mobile terminal is transmitting packet data via a radio channel to another station and there is intermittent transmission of packets such that the packet data only uses a proportion of the available capacity of the channel. In such a scenario, it is normally be necessary for the mobile to continue transmitting control information to the other station to keep the channel open. However, such control transmissions may result in significantly more power being used than with transmission of user data alone.

This problem is being addressed in UMTS by the development of a gated mode, as disclosed for example in our International patent application WO 00/42804. For a normal packet data connection, a control channel (consisting of pilot information, power control commands and transport format indicators) is transmitted continuously to facilitate rapid transmission of packets as they arrive. In gated mode, the control channel is only transmitted in a fraction (⅓ or ⅕ according to present proposals) of the timeslots in a frame when no data is being transmitted. As well as reducing the power consumption of the mobile terminal, such a mode reduces interference levels and should therefore enable increased system capacity.

As initially proposed, there would be no transmissions on a data channel associated with the control channel during operation of gated mode. However, it has been shown that there may in fact be a requirement for some transmission on the data channel during gated mode, for example to enable acceptable power control to be maintained. A problem with enabling transmissions on the data channel during gated mode is that the gated control channel does not have sufficient capacity to indicate the usual range of transport formats for the data channel.

An object of the present invention is to address the problem of signalling transport formats during gated mode.

According to a first aspect of the present invention there is provided a radio communication system comprising a communication channel for the transmission of data from a secondary station to a primary station, the secondary station being operable in a first (normal) and a second (gated) mode and comprising means for repeatedly transmitting a coded word providing information on transport formats applicable to the channel, and means for transmitting a reduced quantity of information when operating in the second mode compared to that transmitted when operating in the first mode, and the primary station comprising means for receiving and decoding the code word, wherein the secondary station comprises means for using a different coding scheme to generate the coded word in each of the modes and the primary station comprises means for selecting one of two different decoding schemes depending on the current mode of operation of the secondary station and for decoding the coded word using the selected decoding scheme.

By using different coding schemes during normal and gated mode improved signalling of transport formats during gated mode is possible. In one embodiment, the coding scheme used during gated mode generates a code word that is a punctured version of the word that would be generated by the normal mode scheme. A wide range of puncturing schemes can be used, with preferred schemes either maximising the distance between code words in a set of code words (which set is smaller than the set of code words available during normal mode) or minimising the number of code words having the smallest distance between them. When a plurality of gating rates are possible, resulting in a range of reductions in the rate of transmission of information during gated mode, the coding scheme for a lower information rate can advantageously generate code words which are truncated versions of code words generated for a higher information rate.

In one preferred embodiment there are only two possible transport formats during gated mode and the code words representing each format have all their bits different (for example one might have all bits set to 0 and the other have all bits set to 1). In general the number of transport formats available during gated mode may advantageously be restricted to be no greater than the number of unique code words which can be generated by the coding scheme employed.

According to a second aspect of the present invention there is provided a primary station for use in a radio communication system comprising a communication channel for the transmission of data from a secondary station to the primary station, wherein means are provided for repeatedly receiving from the secondary station a coded word providing information on transport formats applicable to the channel, for determining whether the secondary station is operating in a first (normal) or a second (gated) mode, for selecting one of two different decoding schemes depending on the current mode of operation of the secondary station and for decoding the coded word using the selected decoding scheme.

According to a third aspect of the present invention there is provided a secondary station for use in a radio communication system comprising a communication channel for the transmission of data from the secondary station to a primary station, the secondary station being operable in a first (normal) and a second (gated) mode and comprising means for repeatedly transmitting a coded word providing information on transport formats applicable to the channel, and means for transmitting a reduced quantity of information when operating in the second mode compared to that transmitted when operating in the first mode, wherein the secondary station comprises means for using a different coding scheme to generate the coded word in each of the modes.

According to a fourth aspect of the present invention there is provided a method of operating a radio communication system comprising a communication channel for the transmission of data from a secondary station to a primary station, the secondary station being operable in a first (normal) and a second (gated) mode, the method comprising the secondary station repeatedly transmitting a coded word providing information on transport formats applicable to the channel and transmitting a reduced quantity of information when operating in the second mode compared to that transmitted when operating in the first mode, and the primary station receiving and decoding the code word, wherein the secondary station uses a different coding scheme to generate the coded word in each of the modes and the primary station selects one of two different decoding schemes depending on the current mode of operation of the secondary station and decodes the coded word using the selected decoding scheme.

The present invention is based upon the recognition, not present in the prior art, that use of different coding schemes during normal and gated mode enables improved signalling of transport formats during gated mode.

Embodiments of the present invention will now be described, by way of example, with reference to the accompanying drawings, wherein:

FIG. 3 is a table showing basis sequences for a (32,10) block code;

Figure 4:
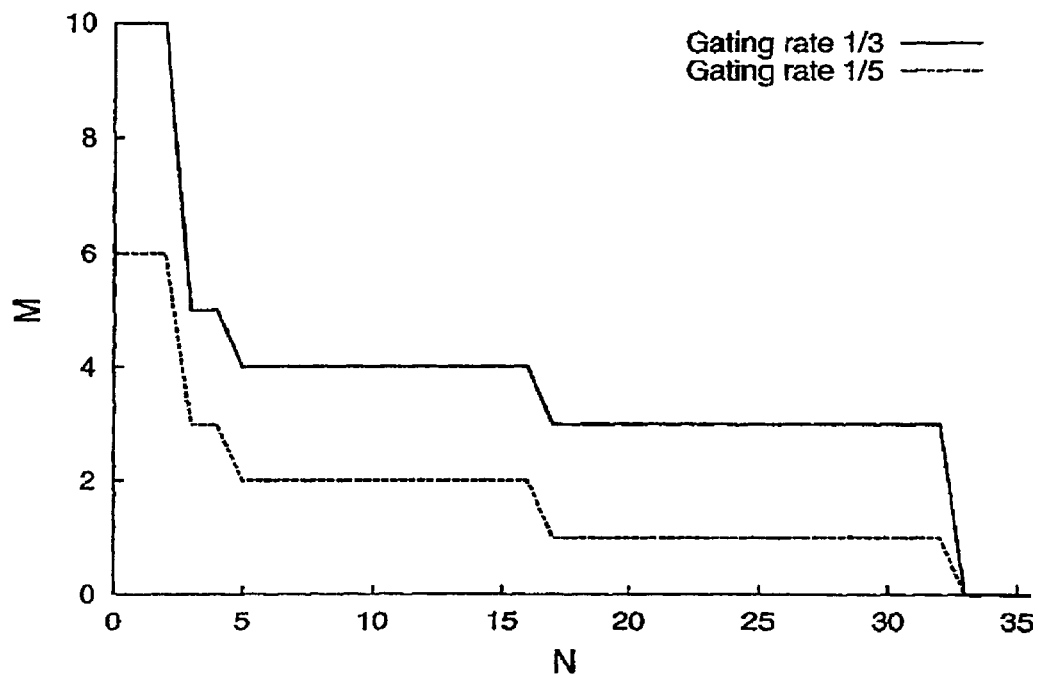
Figure 5:
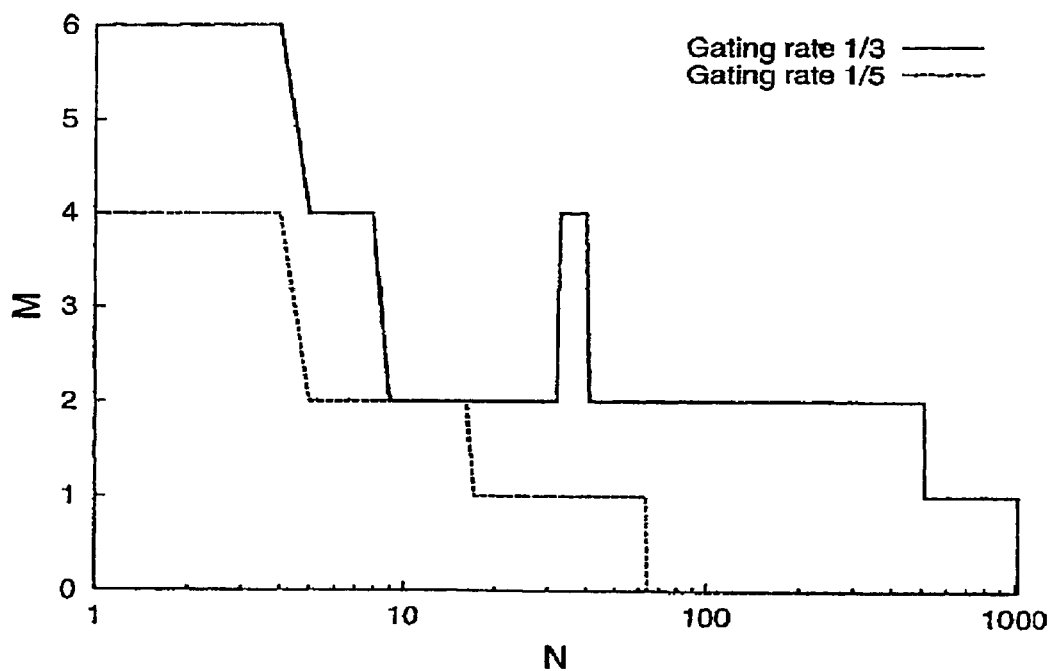

FIG. 4 is a graph of minimum distance M between codewords as a function of the number N of transport format combinations which are permitted during gated mode, with distances for a gating rate of ⅓ shown as a solid line and for a gating rate of ⅕ as a dashed line; and FIG. 5 is a graph of minimum distance M between codewords as a function of the number N of transport format combinations in the transport format combination set during gated mode, with distances for a gating rate of ⅓ shown as a solid line and for a gating rate of ⅕ as a dashed line.

In the drawings the same reference numerals have been used to indicate corresponding features.

Figure 1:
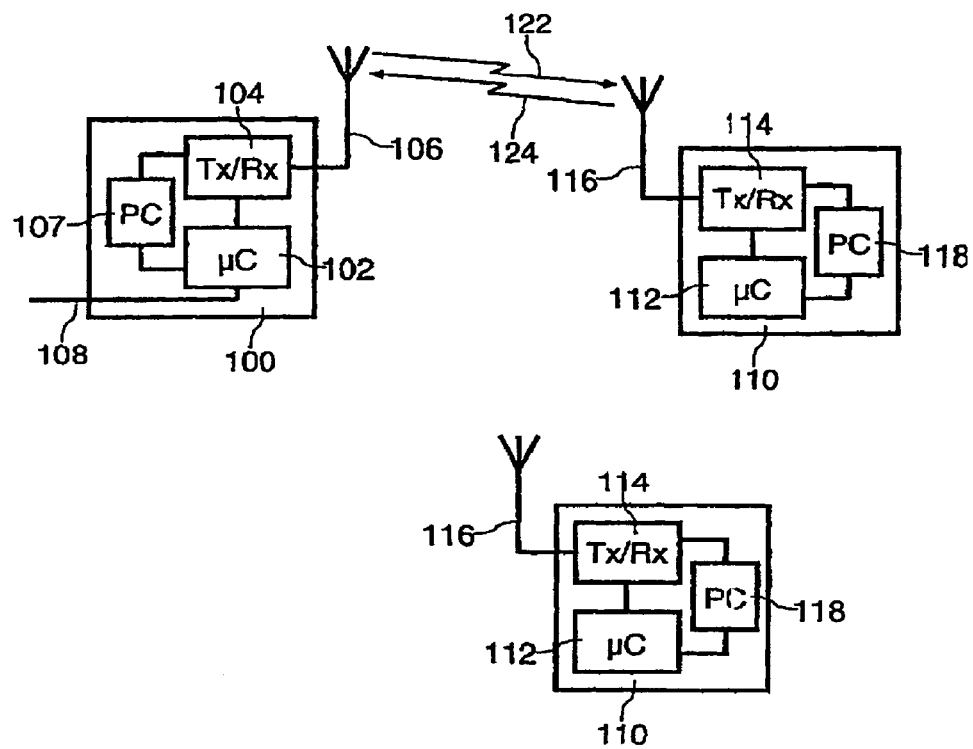
FIG. 1 is a block schematic diagram of a radio communication system.

Referring to FIG. 1, a radio communication system comprises a primary station (BS) 100 and a plurality of secondary stations (MS) 110. The BS 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (μC) 112, transceiver means (Tx/Rx) 114 connected to antenna means 116, and power control means (PC) 118 for altering the transmitted power level. Communication from BS 100 to MS 110 takes place on a downlink channel 122, while communication from MS 110 to BS 100 takes place on an uplink channel 124.

Figure 2:
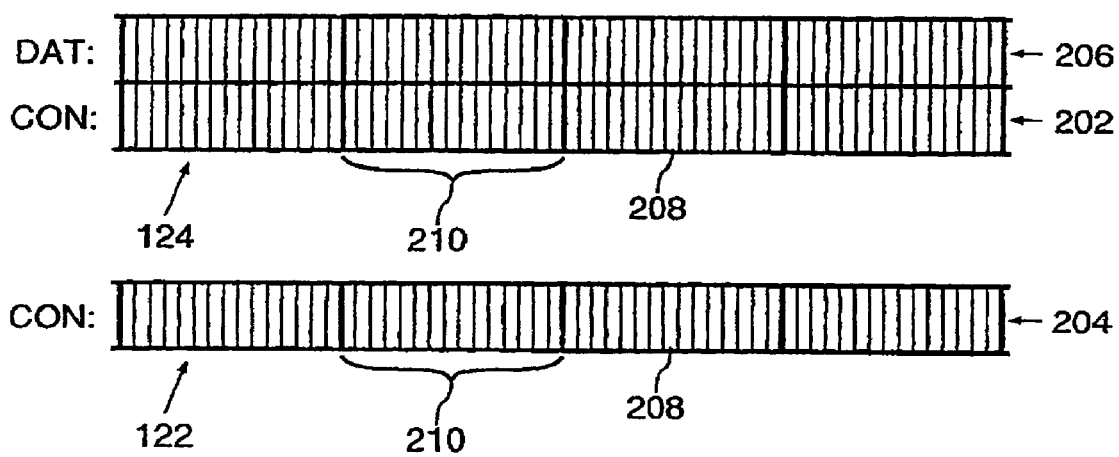
FIG. 2 is a diagram of the channels involved in uplink packet data transmission.

One UMTS embodiment, the frequency division duplex mode, uses the arrangement of channels of FIG. 2 for transmitting packet data from a MS 110 to a BS 100. There are two control channels (CON), an uplink control channel 202 and a downlink control channel 204, and an uplink data channel (DAT) 206. Transmissions on each of the channels 202,204, 206 take place in timeslots 208, which are grouped together in frames 210, each frame 210 comprising 15 timeslots. One or more transport channels are multiplexed together by the system to form the single data channel 206.

The control channels 202, 204 include pilot, power control and transport format information. The pilot information is primarily provided to allow the receiver to estimate the channel impulse response, in order to optimise detection of the received data (i.e. other information in the control channel and a data packet if present). Power control of the uplink channel 124 is required so that the BS 100 receives signals from different MS 110 at a sufficient received Signal to Interference Ratio (SIR), while minimising the transmission power required by each MS 110. Power control of the downlink channel 122 is required so that the MS 110 receives signals from the BS 100 with a low error rate while minimising transmission power, to reduce interference with other cells and radio systems. Power control of each of the channels 122,124 uses an inner and an outer loop. The inner loop adjusts the received SIR to match a target SIR, while the outer loop adjusts the target SIR to the minimum level that will maintain the required quality of service (e.g. bit error rate).

Transport format information provides details of the rate and transmission format of data on the accompanying data channel, to enable the transceivers 104,114 to be appropriately configured. In a UMTS system, this information is provided by transmission of a Transport Format Combination Indicator (TFCI) word on the control channel 202 associated with the data channel 206. The TFCI word is supplied to the physical layer as a 10-bit information word, which is then coded into a 32-bit word using a 32,10 block code. Two bits of the word are transmitted in each timeslot 208, enabling 30 bits of the coded TFCI word to be transmitted in each frame while the remaining 2 bits are not transmitted.

If the MS 110 does not have much data to transmit, there may be periods between transmission of data packets. Normally, the control channels 202,206 would be transmitted continuously between data packets in order to facilitate rapid transmission of packets as they arrive. However, this wastes power and generates interference without any useful data being transmitted, thereby reducing system capacity and the battery life of the MS 110.

To address this problem, a gated mode was proposed (see for example WO 00/42804) in which the number of timeslots 208 per frame 210 for which the uplink control channel 202 is transmitted is reduced by a factor of 3 or 5. The actual position of the transmitted slots 208 in each frame 210 is calculated according to a pseudo-random function in order to mitigate the electromagnetic interference which may be generated by the intermittent transmission. The downlink control channel 204 may continue unaltered or may also be transmitted in a fraction of the available timeslots 208 during gated mode.

As a consequence of this scheme, during operation of gated mode the number of bits available per frame 210 for the transmission of coded TFCI bits is reduced to 6 (for gating rate ⅕) or 10 (for gating rate ⅓). It was originally envisaged that there would be no transmissions on the data channel 206 during gated mode (and hence only one Transport Format Combination (TFC), that of no data transport blocks at all), so this reduced capacity for TFCI bits was not an issue.

Outer-loop power control is typically based on the error rate of Cyclic Redundancy Checks (CRCs) appended to transport blocks on the data channel 206. In the absence of transmissions on the data channel 206, one option for maintaining outer-loop power control during gating is to use the Bit Error Rate (BER) of the control channel 202 instead of the data CRCs. However, it has recently been shown that the performance of outer-loop power control based on control channel BER is not sufficient.

A solution to this problem is to transmit CRCs alone on the data channel 206 in the same slots 208 as the control channel 202 is transmitted, by appending CRCs to transport blocks of zero length. This opens the possibility of a variety of different TFCs being transmitted during gating. The options could be any permutation of no transport blocks or zero length transport blocks on any or all of the transport channels mapped to the data channel 206. In practice, the permissible TFCs would probably be limited to a subset of these options, but the minimum is likely to be one TFC for no transport blocks at all and one other TFC which includes some zero-length transport blocks to which CRCs would be appended.

Using the TFCI coding scheme described above, if the 32-bit physical layer TFCI codeword were truncated so that only the first 6 of the coded TFCI bits were transmitted, a maximum of only 8 TFCs could be permitted in a Transport Format Combination Set (TFCS) if duplication of the 6-bit codewords for different TFCs were to be avoided.

Further, if only 2 TFCs are permitted, the coding is non-optimal, in the sense that the distance between the codewords (i.e. the number of bits that are different) for the first and second TFCs is only 3, compared to a possible maximum of 6, leading to an increased decoding error rate. This is because the proposed UMTS coding scheme is designed so that if all 32 TFCI bits are transmitted, the TFCI codewords for the first 32 TFCs would be orthogonal. This gives a uniform minimum distance between the codewords, rather than a greater minimum distance between the codewords for the first few TFCs and a smaller minimum distance between subsequent TFCs. Orthogonality between codewords is not necessary in practice as the phase of the received signal carrier can be recovered separately from the pilot bits.

Similarly, if the 32-bit physical layer TFCI codeword were truncated to the first 10 bits, no more than 16 TFCs are possible without duplicating coded TFCI words, and the inter-codeword distance is again non-optimal for the case when only 2 TFCs are permitted.

In a system made in accordance with the present invention, the method for coding and mapping the 10-bit TFCI word from higher layers to the available bits in the radio frame is different in gated mode from the usual method of coding and mapping used in non-gated frames. The method of coding and mapping can be designed to result in unique codewords for a larger range of TFCs than are obtained by simply truncating the usual codewords. Thus a larger number of TFCs are permitted than if the usual codewords are simply truncated.

Further, the method of coding and mapping can be designed such that the codewords are arranged so as to have a larger Hamming distance between them when the number of permitted TFCs is small, in order to minimise the decoding error rate in Basic Gating Periods. In particular, the method of coding and mapping can result in an inter-codeword distance equal to the number of transmitted bits (i.e. the maximum possible) when only two TFCs are permitted during gated mode. The TFCs for gated mode are then assigned low TFC numbers to correspond to large inter-codeword distances.

In a first embodiment of the present invention, during gated mode the 10-bit TFCI word from higher layers is coded using the usual 32,10 code, but then is heavily punctured in a pre-defined manner. This has the advantage of maximum commonality with the usual coding scheme. Preferably, the puncturing is designed so that the coded TFCI words for the different TFCs which are permitted during gated mode have a high distance from each other. In the particular example of only two TFCs being possible, the distance between the transmitted codewords representing each TFC should be equal to the number of transmitted TFCI bits in the frame 210. Since phase information can be obtained from transmitted pilot bits, maximising the separation of the codewords will give more reliable decoding performance for the small number of transmitted TFCI bits than making the transmitted codewords for the first two TFCs orthogonal.

In this embodiment, a linear combination of ten basis sequences is used for the 32,10 block code. The output codeword bits $b_i$, $0 \leq i \leq 31$, are related to the information bits of the input TFCI word $a_n$, $0 \leq n \leq 9$, by $$b_i = \sum_{n=0}^{9} (a_n \times M_{i,n}) \bmod 2$$

where $M_{i,n}$ is the $n^{th}$ basis sequence. The basis sequences $M_{i,n}$ used in this embodiment are shown, by way of example, as a table in FIG. 3. There are 1024 possible TFCI words, assigned in order to the binary representations of 0 to 1023. As mentioned above, this set of basis sequences is chosen so that the TFCI codewords for the first 32 TFCs are orthogonal.

Different bits of the 32-bit codeword can be punctured (meaning deleted) depending on the number of available physical layer bits for TFCI transmission. The maximum possible distances between transmitted codewords can be achieved by many different puncturing patterns. In a preferred embodiment, which has the advantage of being more straightforward to implement, the non-punctured bits for smaller numbers (e.g. 6) of transmitted bits form a subset of the non-punctured bits for larger numbers (e.g. 10) of transmitted bits. There are many puncturing patterns which meet this criterion in addition to maximising the distances between transmitted codewords for both gating rate ⅕ and gating rate ⅓. One such puncturing pattern is obtained by transmitting only the bits of the coded bits $b_i$ shown in the following table:

| Gating Rate | Transmitted Bits | | | | | | | | | |
|---|---|---|---|---|---|---|---|---|---|---|
| 1/3 | 0 | 4 | 6 | 8 | 10 | 17 | 19 | 21 | 27 | 29 |
| 1/5 | 0 | 4 | 6 | 8 | 10 | 17 | | | | |

FIG. 4 is a graph showing the minimum distance M between codewords as a function of the number N of TFCs which are permitted during gated mode using the above patterns. Distances for a gating rate of ⅓ are shown as a solid line and for a gating rate of ⅕ as a dashed line. It can be seen that the minimum distances are especially optimised for the small numbers of TFCs which are likely to occur during gated mode, although there is also considerable flexibility for the support of larger numbers of TFCs if desired in the future.

The above scheme works best if the TFCs which are suitable for use in gated mode are described by the first few TFCI words. However, it may not always be possible to arrange this. In this case the best way of puncturing the standard code would be to aim to minimise the number of codewords which have the smallest distances between them, rather than aiming to maximise the distance between the first few codewords.

An example of a puncturing pattern which achieves this is obtained by transmitting only the bits of the coded bits $b_i$ shown in the following table:

| Gating Rate | Transmitted Bits | | | | | | | | | |
|---|---|---|---|---|---|---|---|---|---|---|
| 1/3 | 0 | 2 | 4 | 9 | 14 | 16 | 17 | 27 | 28 | 30 |
| 1/5 | 0 | 2 | 4 | 9 | 14 | 16 | | | | |

FIG. 5 is a graph showing the minimum distance M between codewords as a function of the number N of TFCs in the TFCS using the above patterns. Distances for a gating rate of ⅓ are shown as a solid line and for a gating rate of ⅕ as a dashed line.

In a second embodiment of the present invention, a different coding scheme could be used for the TFCI word in gated mode, for example a 6,10 or 10,10 code designed to have similar distance properties to those described above.

As an enhancement of the above embodiments (or alternatively as a separate embodiment), the number of TFCs in the TFCS could be restricted to a value less than or equal to the highest TFC number which can be coded uniquely by whatever coding scheme is used by the physical layer. For example, in the coding scheme illustrated by FIG. 4, the number of TFCs could be restricted to 32 or fewer.

A special case of the above embodiments results from restricting the number of TFCs to two and choosing a puncturing scheme that results in all the transmitted bits of the first TFCI word being different from all those of the second TFCI word, for example all transmitted bits of the first TFCI word being 0 and all transmitted bits of the second TFCI word being 1 (or vice-versa). This effectively uses the TFCI field as a bi-state word to indicate whether or not CRCs are present during gated mode.

A further solution, which could be used instead of or in addition to the above embodiments, is to increase the number of available physical layer bits for transmitting the TFCI word. For example, a different slot format could be used on the control channel. One possibility would be to use the UMTS compressed mode slot formats, which have 3 or 4 TFCI bits per slot at the expense of fewer pilot bits. This would mean that the transmit power of the control channel (in those slots which were transmitted) would have to be increased in order to keep the total pilot energy per slot the same. However, this would partially defeat the purpose of gating in reducing power consumption.

As a further alternative, each TFCI word could be transmitted over a period of more than one radio frame. For example, using a pair of consecutive radio frames for the transmission of each TFCI word would enable 12 coded TFCI bits to be transmitted for gating rate ⅕, or 20 for gating rate ⅓. However, this alternative has the disadvantages of preventing the TFC from being changed every frame and increasing the latency before data can be decoded.

The present invention has been described in relation to gated mode applied to low duty cycle data transmissions on an uplink channel 124. However, it is equally applicable to transmissions on a downlink channel 122, in which case the roles of the BS 100 and MS 110 would be reversed in the description above, with the BS 100 adopting the role of a secondary station and the MS 110 the role of a primary station. In this specification, the use of the term "base station" or "primary station" is to be understood to include the parts of the network fixed infrastructure which interface with mobile stations.

Although embodiments of the present invention were described above using spread spectrum Code Division Multiple Access (CDMA) techniques, as used for example in UMTS embodiments, it should be understood that the invention is not limited to use in CDMA systems.

From reading the present disclosure, other modifications will be apparent to persons skilled in the art. Such modifications may involve other features which are already known in the design, manufacture and use of radio communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

The invention claimed is:

1. A radio communication system comprising a communication channel for the transmission of data from a secondary station to a primary station, the secondary station being operable in a first (normal) and a second (gated) mode and comprising means for repeatedly transmitting a coded word providing information on transport formats applicable to the channel, and means for transmitting a reduced quantity of information when operating in the second mode compared to that transmitted when operating in the first mode, and the primary station comprising means for receiving and decoding the code word, wherein the secondary station comprises means for using a different coding scheme to generate the coded word in each of the modes and the primary station comprises means for selecting one of two different decoding schemes depending on the current mode of operation of the secondary station and for decoding the coded word using the selected decoding scheme.

2. The system of claim 1, wherein the secondary station comprises means for using a coding scheme during the second mode which generates a code word that is a punctured version of the code word that would be generated by the coding scheme used during the first mode.

3. A primary station for use in a radio communication system comprising a communication channel for the transmission of data from a secondary station to the primary station, wherein means are provided for repeatedly receiving from the secondary station a coded word providing information on transport formats applicable to the channel, for determining whether the secondary station is operating in a first (normal) or a second (gated) mode, for selecting one of two different decoding schemes depending on the current mode of operation of the secondary station and for decoding the coded word using the selected decoding scheme.

4. A secondary station for use in a radio communication system comprising a communication channel for the transmission of data from the secondary station to a primary station, the secondary station being operable in a first (normal) and a second (gated) mode and comprising means for repeatedly transmitting a coded word providing information on transport formats applicable to the channel, and means for transmitting a reduced quantity of information when operating in the second mode compared to that transmitted when operating in the first mode, wherein the secondary station comprises means for using a different coding scheme to generate the coded word in each of the modes.

5. The secondary station of claim 4, further comprising means for using a coding scheme during the second mode which generates a code word that is a punctured version of the code word that would be generated by the coding scheme used during the first mode.

6. The secondary station of claim 4, further comprising means for restricting the number of available transport formats during operation of the second mode to no more than the number of unique code words able to be generated by the coding scheme employed.

7. A method of operating a radio communication system comprising a communication channel for the transmission of data from a secondary station to a primary station, the secondary station being operable in a first (normal) and a second (gated) mode, the method comprising the secondary station repeatedly transmitting a coded word providing information on transport formats applicable to the channel and transmitting a reduced quantity of information when operating in the second mode compared to that transmitted when operating in the first mode, and the primary station receiving and decoding the code word, wherein the secondary station uses a different coding scheme to generate the coded word in each of the modes and the primary station selects one of two different decoding schemes depending on the current mode of operation of the secondary station and decodes the coded word using the selected decoding scheme.

8. The method of claim 7, wherein the secondary station uses a coding scheme during the second mode which generates a code word that is a punctured version of the code word that would be generated by the coding scheme used during the first mode.

9. The method of claim 8, wherein the second mode is operable at a plurality of different information rates and by the coding scheme for a lower information rate generating a code word that is a truncated version of the code word generated for a higher information rate.

10. The method of claim 8, wherein a puncturing pattern is arranged to maximize the distance between code words in a set of code words, which set is smaller than the set of code words available during the first mode.

11. The method of claim 10, wherein there are only two possible transport format combinations during operation of the second mode, each represented by a different code word, and by the puncturing scheme ensuring that all the bits of the code words are different.

12. The method of claim 8, wherein a puncturing pattern is arranged to minimize the number of code words which have the smallest distance between code words.

* * * * *